(12) United States Patent
Wu et al.

(10) Patent No.: US 8,956,717 B2
(45) Date of Patent: Feb. 17, 2015

(54) CLEAR OVERCOAT COMPOSITIONS AND METHODS FOR STABILIZING THE SAME

(75) Inventors: Bo Wu, Wilsonville, OR (US); Jule W. Thomas, Jr., West Linn, OR (US)

(73) Assignee: Xerox Corporation, Norwalk, CT (US)

(*) Notice: Subject to any disclaimer, the term of this patent is extended or adjusted under 35 U.S.C. 154(b) by 938 days.

(21) Appl. No.: 13/085,365

(22) Filed: Apr. 12, 2011

(65) Prior Publication Data

US 2012/0264040 A1    Oct. 18, 2012

(51) Int. Cl.
| | | |
|---|---|---|
| *B41M 5/00* | (2006.01) | |
| *G03G 8/00* | (2006.01) | |
| *C09D 11/34* | (2014.01) | |
| *C09D 11/38* | (2014.01) | |
| *B41M 7/00* | (2006.01) | |

(52) U.S. Cl.
CPC *G03G 8/00* (2013.01); *C09D 11/34* (2013.01); *C09D 11/38* (2013.01); *B41M 7/0036* (2013.01)
USPC ...... 428/205; 428/195.1; 428/203; 428/484.1

(58) Field of Classification Search
CPC ...... C09D 11/38; C09D 11/34; B41M 7/0036
USPC ............ 428/195.1, 201, 203, 204, 205, 484.1
See application file for complete search history.

(56) References Cited

U.S. PATENT DOCUMENTS

| | | | | |
|---|---|---|---|---|
| 6,723,767 | B2 * | 4/2004 | Lin et al. | 524/91 |
| 6,860,930 | B2 | 3/2005 | Wu et al. | |
| 7,578,587 | B2 * | 8/2009 | Belelie et al. | 347/105 |
| 2005/0072519 | A1 * | 4/2005 | Johnson et al. | 156/275.5 |
| 2006/0257773 | A1 * | 11/2006 | Wong et al. | 430/108.8 |
| 2008/0199797 | A1 * | 8/2008 | Sacripante et al. | 430/104 |
| 2009/0195572 | A1 | 8/2009 | Kovacs et al. | |
| 2009/0258155 | A1 | 10/2009 | Odell et al. | |
| 2010/0021698 | A1 | 1/2010 | Chretien et al. | |
| 2010/0075038 | A1 * | 3/2010 | Goredema et al. | 427/256 |

OTHER PUBLICATIONS

EPA Naugard 455 acquired from http://www.epa.gov/hpv/pubs/summaries/enylanil/c14714ed.pdf on Apr. 7, 2014.*
U.S. Appl. No. 12/617,230, filed Nov. 12, 2009, to David A. Mantell et al.

* cited by examiner

*Primary Examiner* — Gerard Higgins
(74) *Attorney, Agent, or Firm* — Pillsbury Winthrop Shaw Pittman LLP

(57) ABSTRACT

Present embodiments generally relate to a novel clear or colorless overcoat composition that may be used for overcoating, for example, ink based images and xerographic images. The overcoat composition, which may be used as a base for a clear solid ink, comprises one or more waxes. Also included in the present embodiments is methods for using and stabilizing the overcoat composition as a solid ink.

12 Claims, 1 Drawing Sheet

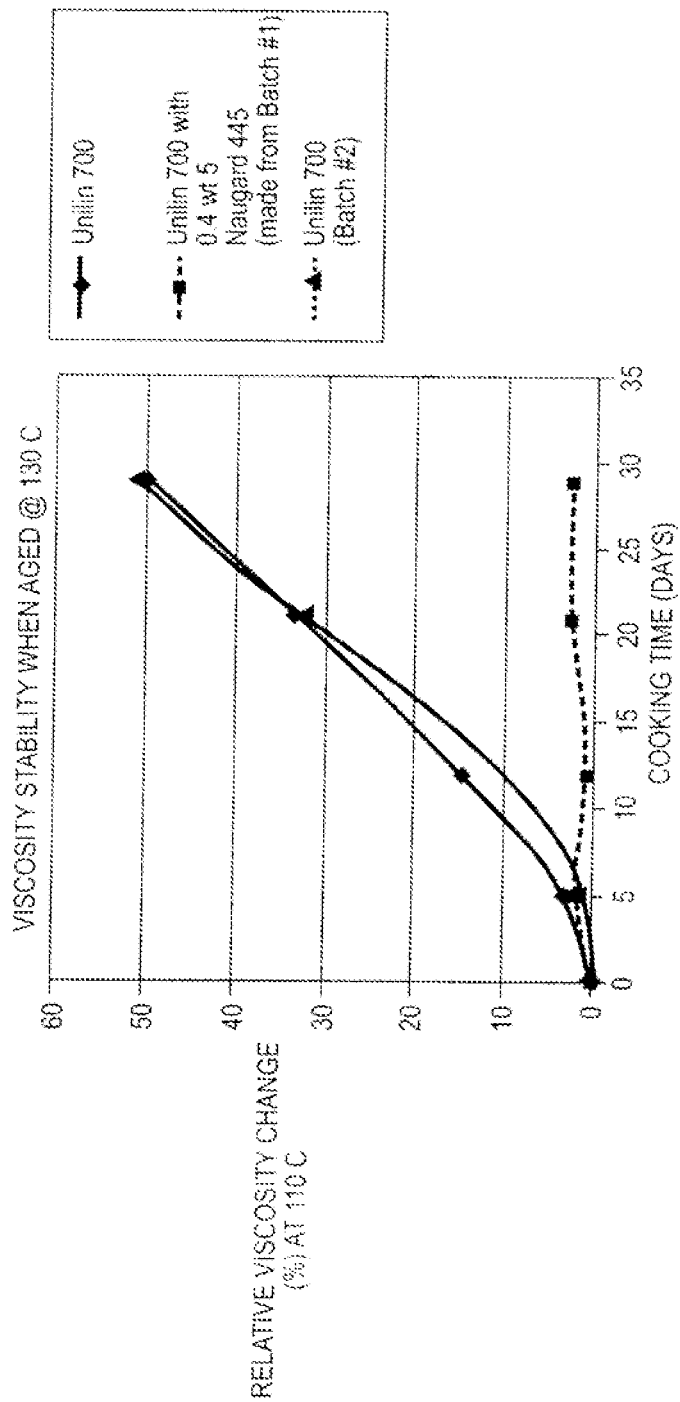

CLEAR OVERCOAT COMPOSITIONS AND METHODS FOR STABILIZING THE SAME

CROSS REFERENCE TO RELATED APPLICATIONS

Reference is made to commonly owned U.S. patent application Ser. No. 13/085,384, filed electronically on the same day as the present application, entitled, "Clear Overcoat Compositions and Method for Using and Detecting the Same" recently issued as U.S. Pat. No. 8,629,414, the entire disclosure of which is incorporated herein by reference in its entirety.

BACKGROUND

The present disclosure generally relates to a clear or substantially colorless overcoat composition that may be used for overcoating, for example, ink based images and xerographic images. The overcoat composition described herein is a clear solid ink which comprises one or more specific waxes that can be used in ink jet printing machines or printers. Also described is methods for using and stabilizing the overcoat composition.

In general, ink jet printing machines or printers include at least one printhead that ejects drops or jets of liquid ink onto a recording or image forming media. A phase change ink jet printer employs phase change inks that are in the solid phase at ambient temperature, but transition to a liquid phase at an elevated temperature. The molten ink can then be ejected onto a printing media by a printhead directly onto an image receiving substrate, or indirectly onto an intermediate imaging member before the image is transferred to an image receiving substrate. Once the ejected ink is on the image receiving substrate, the ink droplets quickly solidify to form an image. In both the direct and offset printing architecture, images may be formed on a media sheet or a media web.

Two difficulties faced in imaging devices, and in particular, imaging devices that utilize phase change ink to form images, are ink rub and offset during handling of the prints. As used herein, ink rub refers to the smearing or scuffing of the ink of an image on a receiving substrate, such as a sheet of paper. Ink offset refers to ink from an image formed on a surface or portion of a surface of a receiving substrate being transferred to another surface or another portion of the substrate. Ink rub and offset is particularly a concern for applications that require extensive handling such as the outside of envelopes or printed sheets inserted into envelopes.

To prevent ink rub and/or offset, some previously known systems have been implemented to apply a protective coating, such as disclosed in U.S. patent application Ser. No. 12/617,230, filed on Nov. 12, 2009, to David A. Mantell et al., over the printed image on the substrate to prevent or minimize ink rub or offset of the printed image. However, there is a continued desire to improve such known systems and methods of protecting ink or toner-based images to, for example, enhance performance of the protective coatings, maintain desired viscosity of the protective coating in the printer over a prolonged period of time so as to avoid clogging, or require less coverage to effect protection in order to reduce costs.

Thus, there remains a need for an overcoat composition that can be used for protecting solid ink and toner-based images, which provides overcoat coating properties including, for example, thermal and light stability, scratch resistance, and smear (or rub) resistance to toner-based images and ink-based images, particularly in commercial print applications, and which can be readily used in current printing systems.

SUMMARY

According to embodiments illustrated herein, there is provided an overcoating composition and methods of use with ink based and xerographic prints.

In one embodiment, there is disclosed a clear or substantially clear overcoat composition used to protect ink-based or toner-based images, comprising: one or more waxes; a stabilizer; and optional resins, wherein the overcoat composition prevents or minimizes smearing or offsetting of the ink-based or toner-based images.

In another embodiment, there is provided a clear or substantially clear overcoat solid ink used to protect ink-based or toner-based images, comprising: a hydroxyl-terminated polyethylene wax; 4,4'-Bis($\alpha,\alpha$-dimethylbenzyl)diphenylamine; and optional resins, wherein the overcoat solid ink prevents smearing or offsetting of the ink-based or toner-based images.

In yet another embodiment, there is provided a protected ink-based or toner-based image, comprising: an ink-based or toner-based image disposed on a substrate; a clear or substantially clear overcoat composition disposed over at least a portion of the ink-based or toner-based image, wherein the overcoat composition comprises one or more waxes, a stabilizer; and optional resins, wherein the protected ink-based or toner-based image exhibits no or less smearing or offsetting.

BRIEF DESCRIPTION OF THE DRAWINGS

For a better understanding, reference may be had to the accompanying FIGURE.

The FIGURE is a graph illustrating the effect of a stabilizer, in the protective overcoat solid ink according to the present embodiments.

DETAILED DESCRIPTION

As explained above, there remains a need for an overcoat composition that can be used for protecting solid ink and toner-based images, which provides overcoat coating properties including, for example, thermal and light stability, scratch resistance, and smear (or rub) resistance to toner-based images and ink-based images, particularly in commercial print applications, and which can also be used in current printing systems. In embodiments, the overcoat composition is used as part of a base for a clear solid ink. In key markets, such as those involving direct-mail applications, prints must maintain high image quality throughout the mail handling process. The overcoat composition provides further improved performance to existing print applications such as less smear and offset. The present embodiments thus provide robust prints that exhibit the desired high image quality even in harsh conditions that involve extended handling.

In particular, the present embodiments provide a clear or substantially colorless overcoat composition comprising one or more specific waxes which is part of a solid ink that can be digitally printed onto the particular image which requires protection. For direct mail, this means to overcoat specific text which requires protection, for example, the address and name of the mail recipient, with the clear overcoat solid ink. In some embodiments, an ink-based image is composed of the overcoat solid ink itself and thus ink-based image will already include the overcoat composition upon formation without need for a separate step coating the ink-based image.

As discussed, the protective overcoat solid ink can be printed to better protect the underlying print images. The solid inks of the present embodiments have been shown to be effective at relatively low coverage of from about 10 percent up to full area coverage. The solid inks have been shown to mitigate offset and smear of prints that are coated over with the solid ink. In addition, the coated images are able to maintain low coefficient of fraction (COF), which is desirable for automatic document feeding systems in current copy machines. In embodiments, the protective solid ink comprises a wax, a thermal stabilizer, optional resins, one or more additives. Examples of additives may include, antioxidants, viscosity modifiers, slip agents, tackifiers, or the like, as disclosed in U.S. Pat. No. 6,860,930, which is hereby incorporated by reference.

The protective solid ink of the present embodiments comprises one or more specific waxes, such as polyethylene waxes, that are commercially available and have suitable melting points and relatively low viscosities. In embodiments, the wax is selected from the group of polyethylene waxes with or without functional groups at the chain ends. In particular embodiments, the functional groups are selected from the group consisting of —OH, —COOH, and the like, and mixtures thereof. These waxes will have melting points at temperatures ranging from about 60° C. to about 150° C., or more specifically, from about 70° C. to about 140° C. The viscosities of these waxes are from about 3 cPs to about 30 cPs at a temperature of 120° C., or more specifically, from about 4 cPs to about 20 cPs at a temperature of 120° C. In specific embodiments, the wax may be a POLYWAX® available from Baker Petrolite (Houston, Tex.). The overcoat solid ink of the present embodiments comprising these waxes has a viscosity of from about 5 to about 15 cPs, or from about 6 to about 14 cPs, at a temperature of about 120° C. Preferably the waxes are hydroxyl-functionalized waxes having at least 18 carbon atoms, preferably from 20 to 100 carbon atoms, optimally from 25 to 75 carbon atoms. In embodiments, the wax is a fully saturated straight chain hydrocarbon, such as a hydroxyl-terminated polyethylene wax. Suitable examples of such waxes include, but are not limited to, UNILIN 350, UNILIN 425, UNILIN 550 and UNILIN 700 with Mn approximately equal to 375, 460, 550 and 700 g/mol, respectively; PW1000, PW655, and PW500 polyethylene waxes with average molecular weights of about 1,000, 655, and 500, respectively. All of these waxes are commercially available from Baker-Petrolite (Sugar Land, Tex.). The wax is present in the protective overcoat solid ink in an amount of from about 30 to about 100 percent, of from about 50 to about 100 percent, or of from about 70 to about 99.98 percent by weight of the total weight of the solid ink.

The overcoat can optionally contain resins, such as for example, amides, urethanes, ureas, and esters. Examples of amides suitable for the present embodiments includes triamides as disclosed in U.S. Pat. No. 6,860,930. The resin is present in the protective overcoat solid ink in an amount of from about 0.5 to about 30 percent, of from about 3 to about 25 percent, or of from about 5 to about 20 percent by weight of the total weight of the solid ink.

In further embodiments, a filtration process can be used to lower the cloud point of the wax to obtain an overcoat solid ink that has relatively loW jetting temperatures, which is desirable for low energy consumption. The cloud point of a fluid is the temperature at which some portion of the wax is no longer completely molten (as the wax is a mixture of varied molecular weights giving varied melting points), precipitating as a second phase giving the fluid a cloudy appearance. In embodiments, cloud point of the wax is reduced to from about 115° C. to about 105° C. In order to jet the protective overcoat solid ink at a temperature as low as possible, a cold filtration process was developed to decrease the cloud point of the filtered overcoat solid ink. In the filtration process, the wax was first heated to a melting temperature (e.g., 130° C.) and then allowed to cool down (e.g., 115° C.) to filter the wax. When this filtration process was used on UNLIN 700, the filtered wax had a cloud point that was 10 degrees lower than its unfiltered counterpart, as shown in Table 1. The viscosity of both filtered and unfiltered wax at 130° C. was 9.13.

TABLE 1

| Cloud Points | | | |
|---|---|---|---|
| Time at the temperature (hr) | Temp (° C.) | Unfiltered UNILIN 700 | Filtered UNILIN 700 |
| 5 | 125 | Clear | Clear |
| 8 | 120 | Clear | Clear |
| 16 | 115 | Little cloudy | Clear |
| 8 | 113 | Little cloudy | Clear |
| 16 | 110 | Little cloudy | Clear |
| 8 | 105 | ½ freezed | Some |
| 16 | 100 | Freezed | Freezed |

The protective overcoat solid ink of the present embodiments also comprises a thermal stabilizer that helps maintain the low viscosity of the solid ink. For example, the viscosity of the solid ink may increase if cooked in the printer over a prolonged period of time, for example, two weeks or more, which results in ink clogging inside the printer heads or print artifacts. Analytic studies reveal that the viscosity increase is caused by esterification between the hydroxyl group in the wax and carboxylic acid generated by thermal oxidation of the hydroxyl-functional group, which led to molecular weight increase as detected by Gel permeation chromatography (GPC). The stabilizer improves the thermal stability of the solid ink by preventing thermal oxidation of the wax thus preventing the formation of esters and increase in viscosity over time, as shown in the FIGURE. The stabilizer is present in the protective overcoat solid ink in an amount of from about 0.05 to about 1.0 percent, of from about 0.10 to about 0.90 percent, or of from about 0.15 to about 0.80 percent, or of from about 0.2 to about 0.5 percent by weight of the total weight of the solid ink.

In embodiments, the stabilizer may be one or more hindered tertiary amines and mixtures thereof. In a specific embodiment, the stabilizer is an aromatic amine available under the tradename NAUGARD 445 (Chemtura Corp. (Middlebury, Conn.)) having the chemical name 4,4'-Bis($\alpha$,$\alpha$-dimethylbenzyl)diphenylamine. As compared to some stabilizers, 4,4'-Bis($\alpha$,$\alpha$-dimethylbenzyl)diphenylamine has been further demonstrated to not impact the color of the resulting prints. For example, while many stabilizers, including 4,4'-Bis($\alpha$,$\alpha$-dimethylbenzyl)diphenylamine, may cause some discoloration to the overcoat solid ink after being cooked (e.g., a yellowing is observed), The prints generated with K Printing Proofer (manufactured by RK Print Coat Ind. Ltd., Litlington, UK) from cooked overcoat solid inks with and without 4,4'-Bis($\alpha$,$\alpha$-dimethylbenzyl)diphenylamine (0.4 percent) showed no difference in the colors. Furthermore, the image of these overcoat solid inks on paper are hardly visible when viewed with naked human eyes.

Optional antioxidants in the ink may further protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3,5-di-tert-butyl-4-hydroxy-hydrocinnamoyloxy)) ethoxyphenyl) propane (TOPANOL-205, available from ICI America Corporation), (3) tris(4-tert-butyl-3-hydroxy-2,6-dimethyl benzyl) isoCyanurate (CYANOX 1790, 41, 322-4, LTDP, Aldrich D12, 840-6), (4) 2,2'-ethylidene bis(4,6-di-tert-butylphenyl) fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42, 009-3), (8) 2,6-di-tert-butyl-4-methoxyphenol (Aldrich 25, 106-2), (9) 2,4-di-tert-butyl-6-(4-methoxybenzyl)phenol (Aldrich 23, 008-1), (10)4-bromo-2,6-dimethylphcnol (Aldrich 34, 951-8), (11)4-bromo-3,5-didimethylphenol (Aldrich B6, 420-2), (12)4-bromo-2-nitrophenol (Aldrich 30, 987-7), (13)4-(diethyl aminomethyl)-2,5-dimethylphenol (Aldrich 14, 668-4), (14) 3-dimethylaminophenol (Aldrich D 14, 400-2), (15)2-amino-4-tert-amylphenol (Aldrich 41, 258-9), (16) 2,6-bis(hydroxymethyl)-p-cresol (Aldrich 22, 752-8), (17) 2,2'-methylenediphenol (Aldrich B4, 680-8), (18)5-(diethylamino)-2-nitrosophenol (Aldrich 26, 951-4), (19) 2,6-dichloro-4-fluorophenol (Aldrich 28, 435-1), (20) 2,6-dibromo fluoro phenol (Aldrich 26, 003-7). (21) a-trifluoro-o-creso-1 (Aldrich 21, 979-7), (22)2-bromo-4-fluorophenol (Aldrich 30, 246-5), (23)4-fluorophenol (Aldrich F1, 320-7), (24) 4-chlorophenyl-2-chloro-1,1,2-tri-fluoroethyl sulfone (Aldrich 13, 823-1), (25) 3,4-difluoro phenylacetic acid (Aldrich 29, 043-2), (26)3-fluorophenylacetic acid (Aldrich 24, 804-5), (27) 3,5-difluoro phenylacetic acid (Aldrich 29, 044-0), (28)2-fluorophenylacetic acid (Aldrich 20, 894-9), (29) 2,5-bis(trifluoromethyl)benzoic acid (Aldrich 32, 527-9), (30) ethyl-2-(4-(4-(trifluoromethyl)phenoxy)phenoxy) propionate (Aldrich 25, 074-0), (31) tetrakis (2,4-di-tert-butyl phenyl)-4,4'-biphenyl diphosphonite (Aldrich 46, 852-5), (32) 4-tert-amyl phenol (Aldrich 15, 384-2), (33)3-(2H-benzotriazol-2-yl)-4-hydroxy phenethylalcohol (Aldrich 43, 071-4), NAUGARD 76, NAUGARD 512, AND NAUGARD 524 (manufactured by Uniroyal Chemical Company), and the like, as well as mixtures thereof. The antioxidant, when present, may be present in the ink in any desired or effective amount, such as from about 0.15 percent to about 10 percent by weight of the ink or from about 0.2 percent to about 3 percent by weight of the ink.

Many phase change inks have an electrical conductivity of essentially zero. Thus, conductivity enhancing agents may be added to the ink vehicle in order to provide consistent conductivity to the ink. The conductivity is used as an input signal for a level sensor in the ink reservoir of the ink jet device.

The overcoat compositions of the present embodiments may further include conventional additives to take advantage of the known functionality associated with such conventional additives. Such additives may include, for example, defoamers, slip and leveling agents, and the like.

Other optional additives such as dispersing agents or surfactants may be present in the inks, typically in amounts of from about 0.01 to about 20 percent by weight. Plasticizers that may be used include pentaerythritol tetrabenzoate, commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMED M-18-OL (C. P. Hall Company), a benzyl phthalate, commercially available as SANTICIZER 278 (Ferro Corporation), and the like, may be added to the ink vehicle, and may constitute from about 1 to 40 percent of the ink vehicle component of the ink. Plasticizers can either function as the ink vehicle or can act as an agent to provide compatibility between the ink components.

The ink can also optionally contain a UV absorber. The optional UV absorbers primarily protect the generated images from UV degradation.

The overcoat composition of the present embodiments may be jetted directly onto the image receiving substrate. The overcoat composition may then be leveled by contact or non-contact leveling, for example as disclosed in U.S. Patent Publication No. 2009/0195572. The present embodiments may be used in a transfix inkjet device, such as, for example, a solid inkjet printer, an inkjet printer, or an inkjet facsimile machine, which use an intermediate substrate. However, the systems and methods herein are equally applicable to direct printing systems where the images are jetted directly onto image receiving media without use of an intermediate substrate.

The overcoat solid inks of the present disclosure can be used in image processing comprising generating an ink-based or toner-based image on a substrate, following the generation of the image, ink jetting the overcoat composition or solid ink onto the substrate as a whole, onto the image as a whole, onto part(s) of the image, onto part(s) of the substrate, or any combination thereof, and curing the overcoat solid ink. These inks have been shown to be effective at relatively low coverage of from about 10 percent up to full area coverage.

The substrate employed can be any appropriate substrate depending upon the end use of the print. Exemplary substrates include, but are not limited to, plain paper, coated paper, plastics, polymeric films, treated cellulosics, wood, xerographic substrates, ceramics, fibers, metals and mixtures thereof, optionally comprising additives coated thereon.

When coating a toner-based image, the fused toner-based print is obtained first and then subjected to an ink jet printer containing the jettable overcoat composition or solid ink. The toner-based print can be prepared by any suitable conventional xerographic technique or variant thereof. Similarly, when coating anink-based image, the ink-based image is generated first and then subjected to an ink jet printer containing the jettable overcoat solid ink. If the ink-based image is formed using an ink jet printer, then the ink-based image can be subjected to a separate ink jet printer containing the jettable overcoat solid ink or the ink jet ink can be housed in the same ink jet printer as the overcoat solid ink, whereby the overcoat solid ink is coated onto the substrate and/or image as a colorless, transparent fluid after the ink jet ink image is formed. When the overcoat solid ink is coated over an ink-based image, particularly, an image produced using an ink jet printer, the image can be prepared by any suitable conventional process or variant thereof. When the overcoat composition is part of a solid ink, an ink-based image is simply generated by directly applying the solid ink composition to a substrate. Thus, the ink-based image will already include the overcoat composition upon formation.

When the overcoat composition or solid ink is coated separately onto an image, parts thereof, substrate, and/or parts thereof, it can be applied at different levels of resolution. For example, the overcoat solid ink can be applied at the resolution of the print halftone dot, at the resolution of distinct part(s) of the image, or at a little less resolution than distinct part(s) of the image, allowing for some overlap of the overcoat solid ink onto nonimaged areas of the substrate. The typical composition deposition level is in an amount of from about 5 to about 50 picolitres drop size. The overcoat solid ink can be applied in at least one pass over the image at any stage in the image formation using any known ink jet printing technique, such as, for example, drop-on-demand ink jet printing including, but not limited to, piezoelectric and acoustic ink jet printing. The application of the overcoat solid ink can be controlled with the same information used to form the image such that only one digital tile is needed to produce the image and the overcoat solid ink. Thus, the overcoat solid ink is fully digital.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Material Screening

Table 2 below listed the material or mixture of materials considered for the protective overcoat solid ink. All are commercially available or have been used currently in XEROX colored inks.

PW1000, PW655, and PW500 are polyethylene waxes with molecular weight of about 1000, 655, and 500, respectively, available from Baker-Petrolite. C80 is a wax similar to PW655 but is made from Fischer-Tropsch process with a little branchness in structure, available from Sasol Wax Americas, Inc. as SASOLWAX C80. UNILIN 700 is a polyethylene wax with one hydroxyl functional group at one end of the straight hydrocarbon chain, available from Baker Petrolite. S-180 is a monoamide wax, stearyl stearamide wax, available from Crompton Corporation, Greenwich, Conn. as KEMAMIDE S-180. Triamide is a branched amide, for example, as described in Example II of U.S. Pat. No. 6,860,930.

The prints made with the overcoat solid inks in Table 2 were generated on paper with K Printing Proofer. These prints were used for measuring coefficient of friction (COF) of the overcoats. The method of measuring COF was described in U.S. Pat. No. 6,481,840. As shown in Table 2, both C80 and S-180 have high coefficient of friction (COF), which is not a desirable feature for the overcoat solid ink. In contrast, waxes UNILIN, waxes POLYWAX, and mixture of Triamide/PW655 showed desirable low COF.

Smear and Offset Testing

Four overcoat ink samples (using different wax candidates) were produced by mixing at molten stage and filtration, and used to print and coat some print images. The resulting coated prints were tested on the commercial post office handling machine by going through regular mail process for smear and offset with different coverage of the overcoat solid ink, and the performance were judged, with numerical numbers to express the extent of smear or offset of the colored image. The base ink is a current Xerox COLORQUBE ink but without dye and comprising wax and resins such as an amide.

The results are illustrated in Tables 3 and 4. Table 3 provides the smear results of prints protected with protective overcoat solid ink of the present embodiments and Table 4 provides the offset results of prints protected with protective overcoat solid ink of the present embodiments. The numbers are the extent of offset of smear or offset (the higher the number, the worse the performance). The results shown in Tables 3 and 4 demonstrate that use of these wax candidates in the overcoat solid ink can mitigate undesirable smear and offset, the extent depending on coverage of overcoat on the prints. Among these candidates, the ink base, PW655 and UNILIN 700 are superior to S-180 and C80 in protecting underneath prints.

TABLE 2

| Materials/Overcoat | Viscosity @ 110° C. (cPs) | Viscosity @ 120° C. (cPs) | COF (Static) | COF (Kinetic) | Peak Melting Point (° C.) | Peak Freezing Point (° C.) |
|---|---|---|---|---|---|---|
| PW1000 | N/A | 19.17 | 0.190 | 0.222 | 114.0 | 100.6 |
| PW655 | 8.61 | 6.97 | 0.238 | 0.280 | 94.5-97.7 | 85.7 |
| PW500 | 4.69 | 3.87 | 0.413 | 0.454 | 79.5 | 72.1 |
| C80 | 5.48 | 4.67 | 0.623 | 0.669 | 82-84 | 70-74 |
| UNILIN 700 | 14.5 | 10.76 | 0.228 | 0.300 | 100.6 | 91.3 |
| S-180 | 9.74 | 7.29 | 0.738 | 0.785 | 94.0 | 86.6 |
| Triamide/PW655 mixture (w/w: 1/9) | 10.95 | 8.55 | 0.269 | 0.308 | 95.0 | 85.0 |

TABLE 3

Smear Performance of Prints with Different Overcoats

| | Overcoat % Coverage | | | | | |
|---|---|---|---|---|---|---|
| | 0% | 10% | 20% | 40% | 60% | 80% |
| C80 | 5 | 4 | 4 | 4 | 3 | 2 |
| Ink base | 5 | 4 | 3 | 2 | 2 | 1 |
| PW655 | 5 | 4 | 3 | 2 | 2 | 1 |
| S-180 | 5 | 4 | 3 | 2 | 2 | 1 |
| UNILIN 700 | 5 | 4 | 3 | 2 | 2 | 1 |

TABLE 4

Offset Performance of Prints with Different Overcoats

| | Overcoat % Coverage | | | | | |
|---|---|---|---|---|---|---|
| | 0% | 10% | 20% | 40% | 60% | 80% |
| C80 | 5 | 4 | 2 | 2 | 2 | 2 |
| Ink base | 5 | 3 | 2 | 2 | 1 | 1 |
| PW655 | 5 | 3 | 3 | 2 | 1 | 1 |
| S-180 | 5 | 4 | 3 | 3 | 2 | 1 |
| UNILIN 700 | 5 | 4 | 2 | 2 | 1 | 1 |

Coefficient of Friction (COF) Testing

The solid filed images were generated on Xerox 4200 paper from commercial Xerox Phaser® 8860 printer. Then, the overcoat ink samples were printed on top of these solid field images with about 40% coverage. The resulting coated prints were tested for their COF. The results listed in Table 5 demonstrated that UNILIN 700 and PW655 have the desirable small COF. The control in the table below is the image generated from Xerox commercial Phaser® 8860 printer and inks.

TABLE 5

| Prints | Coefficient of Friction (Static) | Coefficient of Friction (Kinetic) |
|---|---|---|
| Control (No Overcoat) | 0.340 | 0.376 |
| Ink base Overcoat | 0.420 | 0.422 |
| PW655 Overcoat | 0.321 | 0.362 |
| S-180 Overcoat | 0.888 | 0.992 |
| UNILIN 700 Overcoat | 0.288 | 0.328 |
| C80 Overcoat | 0.540 | 0.494 |

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A protected ink-based or toner-based image, comprising:
    an ink-based or toner-based image disposed on a substrate;
    a clear or substantially clear overcoat composition disposed over at least a portion of the ink-based or toner-based image, wherein the overcoat composition comprises
    a hydroxyl-terminated polyethylene wax, the hydroxyl-terminated polyethylene wax being present in the overcoat composition in an amount of 70 percent to 99.98 percent by weight of the total weight of the overcoat composition;
    a stabilizer; and
    an optional resin, wherein the protected ink-based or toner-based image exhibits no smearing or offsetting.

2. The protected ink-based or toner-based image of claim 1, wherein the hydroxyl-terminated polyethylene wax has a viscosity of from about 3 to about 30 cPs at a temperature of about 120° C.

3. The protected ink-based or toner-based image of claim 1, wherein the optional resin is selected from the group consisting of urethane, amide, ester, and mixtures thereof.

4. The protected ink-based or toner-based image of claim 1, wherein the stabilizer is a hindered tertiary amine.

5. The protected ink-based or toner-based image of claim 4, wherein the stabilizer is 4,4'-Bis(α,α-dimethylbenzyl)diphenylamine.

6. The protected ink-based or toner-based image of claim 1, wherein the stabilizer is present in an amount of from about 0.05 to about 1.0 percent by weight of the total weight of the overcoat composition.

7. The protected ink-based or toner-based image of claim 1, wherein the clear overcoat composition further includes an additive selected from the group consisting of a dispersant, antioxidant, viscosity modifier, slip agent, tackifier and mixtures thereof.

8. The protected ink-based or toner-based image of claim 1, wherein the overcoat composition is a solid ink.

9. The protected ink-based or toner-based image of claim 8, wherein the overcoat solid ink is thermally stable in printer for a period of about two weeks or more.

10. The protected ink-based or toner-based image of claim 8, wherein the overcoat solid ink has a viscosity of from about 5 to about 15 cPs at a temperature of about 120° C.

11. The protected ink-based or toner-based image of claim 1, wherein the overcoat composition is disposed on from about 10 percent of the ink-based or toner-based image to about 100 percent of the ink-based or toner-based image.

12. The protected ink-based or toner-based image of claim 1, wherein the overcoat composition is applied to the ink-based or toner-based images by an inkjet printer.

* * * * *